United States Patent

Funato et al.

[11] Patent Number: 5,204,413
[45] Date of Patent: Apr. 20, 1993

[54] PROCESS FRO PRODUCING RESIN FOR A TONER

[75] Inventors: Ryo Funato, Nagoya; Syuji Takahiro, Kasugai; Keiji Yoshida, Nagoya; Shinji Kubo, Nagoya; Motoshi Inagaki, Nagoya, all of Japan

[73] Assignee: Mitsubishi Rayon Company, Limited, Tokyo, Japan

[21] Appl. No.: 676,072

[22] Filed: Mar. 27, 1991

Related U.S. Application Data

[62] Division of Ser. No. 384,799, Jul. 25, 1989, Pat. No. 5,071,918.

[30] Foreign Application Priority Data

Aug. 10, 1988 [JP] Japan ............... 63-199319

[51] Int. Cl.$^5$ .............. C08F 4/36; C08F 257/02; C08F 265/06; G03G 9/08
[52] U.S. Cl. ................... 525/273; 525/263; 525/265; 525/302; 525/308; 525/309; 430/105; 430/109
[58] Field of Search ............... 525/273, 263, 265, 302, 525/308, 309; 430/105, 109

[56] References Cited

U.S. PATENT DOCUMENTS

| | | |
|---|---|---|
| 3,917,745 | 11/1975 | D'Angelo et al. ............ 525/273 |
| 3,962,197 | 6/1976 | Khenna ..................... 526/80 |
| 4,201,848 | 5/1980 | Kotani ..................... 525/314 |
| 4,386,147 | 5/1983 | Seimiya et al. .............. 430/99 |
| 4,486,524 | 12/1984 | Fujisaki et al. .............. 430/109 |
| 4,499,168 | 2/1985 | Mitsuhashi ................. 430/99 |
| 4,557,991 | 12/1985 | Takagiwa et al. ............ 430/109 |
| 4,626,488 | 12/1986 | Inoue ...................... 430/109 |
| 4,652,511 | 3/1987 | Ueda et al. ................. 525/309 |

FOREIGN PATENT DOCUMENTS 63-178103  7/1988  Japan .

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

A process for producing a toner resin by a two-step suspension polymerization process, which entails preparing a polymer of high molecular weight having a weight average molecular weight of greater than about 350,000 from at least one monomer having a polymerizable vinyl group using a compound having at least three t-butyl peroxide groups in one molecule, as a polymerization initiator, and then preparing a low molecular weight polymer in the presence of the high molecular weight polymer. A toner having an excellent fixing property and offset resistance can be obtained from the above resin.

6 Claims, No Drawings

PROCESS FRO PRODUCING RESIN FOR A TONER

This is a division of application Ser. No. 07/384,799 filed on Jul. 25, 1989 now U.S. Pat. No. 5,071,918.

BACKGROUND OF THE INVENTION

1. Field of the Invention

The present invention provides a process for producing resin for a toner, which resin has an excellent offset resistance and fixing property.

2. Description of the Background

Many proposals have been made regarding dry type toner resins. However, in view of the need for an increased information processing rate, it has become very desirable for copying machines and recording apparatus to have increased copying speeds.

Additionally, in order to conserve energy, there is also presently a need for a toner which can be fixed at lower temperatures than at present.

On the other hand, the melting viscosity of a resin is reduced if the fixing property of the toner at a lower temperature is improved. This results in easy deposition of the toner to a fixing roll and worsening of offset resistance. One method for resolving this problem has been proposed wherein a resin having a wide molecular weight distribution is used for the toner. For example, there can be mentioned a method of preparing a high molecular weight polymer and a low molecular weight polymer separately by solution polymerization and, subsequently, mixing the polymers in the liquid state and then removing the solvent. Unfortunately, it is difficult to produce a high molecular weight polymer with a weight average molecular weight of higher than 200,000 using the solution polymerization process. Further, since the solvents used for the high molecular weight polymer and those for the low molecular weight polymer differ greatly, uniform mixing of the two kinds of the polymers is difficult even when in solution. In addition, the above technique requires the removal of solvent which is troublesome and increases cost.

Further, even by the suspension polymerization process which is advantageous in view of the cost, it is difficult to produce high molecular weight polymers with a molecular weight of higher than 200,000. Moreover, polymers having a sufficiently wide molecular weight distribution are as yet unobtainable.

Emulsion polymerization has been used to obtain high molecular weight polymers, however, since emulsifier remains in the resin formed, the moisture resistance and fluidity of the toner are reduced and/or special liquid waste processing is necessary because of high biological oxygen demand (BOD) in liquid wastes therefrom.

Thus, a need continues to exist for a process for producing a uniform resin for toner having a wide molecular weight distribution which avoids the problems associated with the conventional methods used for preparing toner resin.

SUMMARY OF THE INVENTION

Accordingly, it is an object of the present invention to provide a process for producing a uniform toner resin having a wide molecular weight distribution.

It is also an object of the present invention to provide a process for producing a uniform toner resin containing a high molecular wight polymer of a specific molecular weight and a low molecular weight polymer produced by superior polymerization.

The above object and others are provided by a process for producing a toner resin by a two-step suspension polymerization process, which entails preparing a polymer of high molecular weight having a weight average molecular weight of greater than about 350,000, from at least one monomer having a polymerizable vinyl group using a compound having at least three t-butyl peroxide groups per molecule as a polymerization initiator, and then preparing a low molecular weight polymer in the presence of the high molecular weight polymer.

DETAILED DESCRIPTION OF THE PREFERRED EMBODIMENTS

The object of the present invention is achieved by a process for producing a toner resin which comprises a two step suspension polymerization process, comprising, first, preparing a polymer of high molecular weight having a weight average molecular weight of greater than 350,000, using a compound having at least three t-butyl peroxide groups in one molecule as a polymerization initiator, and then preparing a low molecular weight polymer in the presence of the high molecular weight polymer.

Any monomer having a polymerizable vinyl group may be used in the present invention so long as it can provide a vinyl polymer by suspension polymerization. For example, there may be used monomers such as styrene, α-methyl styrene, styrene derivatives having, as a substituent, an o-methyl group, m-methyl group, p-methyl group, p-ethyl group, 2,4-dimethyl group, p-butyl group, p-hexyl group, p-octyl group, p-nonyl group, p-decyl group, p-methoxy group, p-phenyl group, etc., acrylic acid esters or a methacrylic acid ester of the general formula: $CH_2=CR-COOR'$, in which R represents hydrogen or methyl group and R' represents a methyl group, ethyl group, n-propyl group, isopropyl group, n-butyl group, isobutyl group, sec-butyl group, t-butyl group, n-pentyl group, n-hexyl group, n-octyl group, 2-ethylhexyl group, n-nonyl group, isononyl group, decyl group, dodecyl group, tridecyl group, stearyl group, dococyl group, cyclohexyl group, benzyl group, phenyl group, methoxy ethyl group, ethoxy ethyl group, butoxy ethyl group, phenoxy ethyl group, etc., vinyl esters such as vinyl acetate and vinyl propionate and acrylic acid or methacrylic acid derivatives such as acrylonitrile and methacrylonitrile. They may be used alone or in combination using two or more. As an example of the combination, there can be mentioned monomer mixtures containing styrene and/or a derivative thereof, or (meth)-acrylic acid alkyl ester as the main ingredients.

In the present invention, compounds having three or more t-butyl peroxide groups in one molecule are used as the polymerization initiator for the preparation of the high molecular weight polymer. For example, there can be mentioned 2,2-bis(4,4-di-t-butylperoxycyclohexyl)-propane, which is commercially available.

By using the present initiators, it is possible to obtain a high molecular weight polymer with a weight average molecular weight of higher than 350,000. Such a high molecular weight polymer cannot be obtained by suspension polymerization using conventional polymerization initiators.

The amount of the initiator to be added for the high-molecular weight polymer is usually from about 0.01 to about 1% by weight based upon the monomer, which can be selected depending on the properties of the resin being prepared.

There is no particular restriction for the polymerization initiator used in the preparation of the low molecular weight polymer and any known initiators, such as peroxides or azo compounds, for example, having radical polymerization activity can generally be used. For example, there may be used di-t-butyl peroxide, t-butyl cumyl peroxide, dicumyl peroxide, acetyl peroxide, isobutylyl peroxide, octanonyl peroxide, decanonyl peroxide, lauroyl peroxide, 3,3,5-trimethyl hexanoyl peroxide, benzoyl peroxide, m-toluoyl peroxide, t-butyl peroxy acetate, t-butylperoxy isobutylate, t-butylperoxy pivalate, t-butylperoxy neodecanoate, cumylperoxy neodecanoate, t-butylperoxy-2-ethyl hexanoate, t-butylperoxy-3,5,5-trimethyl hexanoate, t-butylperoxy laurate, t-butylperoxy benzoate, t-butylperoxyisopropyl carbonate and azobisisobutylonitrile. They are used alone or as a mixture of two or more of them. Among them, use of octanonyl peroxide, decanonyl peroxide, lauroyl peroxide, benzoyl peroxide and m-toluoyl peroxide is preferred in view of the long lasting polymerization activity for the monomer and for completing the polymerization in a relatively short period of time. The amount of the initiator to be added for the low molecular weight polymer is usually from about 1 to about 15% by weight based upon the total weight of the initiator and monomer.

For the suspension polymerization of the present invention, a conventional method may be used in selecting the polymerization conditions. That is, water may be used in an amount of about 1 to 10 times, preferably, 2 to 4 times to that of the monomer, a suspension-dispersion stabilizer may be used and, if required, the dispersion aid is charged in a reactor equipped with a thermometer. While stirring is being conducted, monomer and polymerization initiator are added under normal temperatures or under heating. The monomer is heated to a predetermined polymerization temperature, and polymerization is initiated.

Known suspension-dispersion stabilizers may be used. As specific examples, there can be mentioned polyvinyl alcohol, partially saponified vinyl alcohol, the sodium salt or potassium salt of a homo- or copolymer of acrylic or methacrylic acid, water-soluble resins such as carboxymethylcellulose, gelatin or starch, for example. Also, less water soluble or non-water soluble inorganic powders such as barium sulfate, calcium sulfate, barium carbonate, calcium carbonate, magnesium carbonate and calcium phosphate may also be used. These suspension-dispersion stabilizers are used in such an amount as required for completing the procedures with no coagulation of the resultant resin particles during polymerization and they are used, generally, from 0.01 to 5 parts by weight, preferably, from 0.05 to 2 parts by weight based on 100 parts by weight of water.

Further, if required, an electrolyte such as sodium chloride, potassium chloride, sodium sulfate and potassium sulfate may be used as a dispersion aid.

In the present invention, the low molecular weight polymer is prepared by polymerization in the presence of the high molecular weight polymer. Usually, polymerization of the low molecular weight polymer is started by adding an initiator for the low molecular weight polymer, which is dissolved in water or the monomer, when the polymerization degree of the monomer for the high molecular weight polymer reaches about 10–15%. At this time, additional monomer, water, dispersing agent and chain transfer agent, for example, may be added if necessary. When the monomer is added, it is added in such an amount that the content of the resultant low molecular weight polymer is usually from 50 to 90% by weight in the toner resin. The weight average molecular weight of the resultant low molecular weight polymer is usually about from 2,000 to 50,000.

The polymerization is carried out as described above, and after the polymerization is completed, the resultant products are heated for a certain time, to decompose the residual initiator, and then the products are cooled, sufficiently washed, dewatered and then dried.

As the softening temperature (Ts) and the glass transition point (Tg), for the resultant toner resin, it is preferred that Ts be about 110°–170° C. and Tg be about 40°–80° C. in view of the fixing property, offset resistance, storability and fluidity.

The present invention will now be described in further detail with reference to examples. It is understood that the present invention is by no means restricted by such specific examples as these examples are only for the purpose of illustration and are not intended to be limitative. In the examples, "parts" mean "parts by weight".

The evaluation of properties of the resins and toners in the examples were conducted using the method described below.

Softening Point (Ts)

Sample resin was flown out by one gram using a flow tester, Model CFT-500 A manufactured by Shimazu Seisakusho Co., through a nozzle of 1 mm$\phi$ diameter and 10 mm length under a load of 30 kg and at a temperature elevation rate of 3° C./min. The temperature when the sample resin was flown out by 0.5 g was defined as the softening temperature.

Glass Transition Temperature (Tg)

A chromatogram was prepared by a differential thermometer at a temperature elevation rate of 10° C./min and the crossing point between the base line and the heat absorption curve near Tg in the resultant chart was defined as the glass transition temperature of the resin.

Fixing Property

A cellophane tape was appended to a fixed toner image and then peeled therefrom, and a temperature of a fixing roller when the image density (ID) after the separation of the type reached 80% of the ID before appending the tape at a level of an initial ID of 0.6 is defined as a limit temperature for fixing. At a temperature lower than the limit temperature, the ID after the separation of the tape will reduce to lower than 80% of the ID before the separation of the tape.

Offset Resistance

The extent of contamination of the fixing roller with the toner was visually judged and offset resistance was evaluated by the lowest temperature at which the contamination of the fixing roller occurs. At a temperature higher than the lowest temperature, contamination of the fixing roller is observed.

Storability

The toner was maintained in a dryer at 50° C. for 50 hours and the extent of blocking was visually judged.

⊚: not blocked
○: some blocking occurred
Δ: blocking occurred but the toner usable
X: remarkable blocking occurred and the toner could not be used Moisture Resistance The toner was left for 20 hours in two different circumstances for the atmospheric temperature and the relative humidity, i.e., 30° C.; 85% and 10° C.; 15%, respectively, and the charging performance was measured and the circumstance dependency was evaluated.
○: little circumstance dependency
Δ: some circumstance dependency
X: remarkable circumstance dependency

EXAMPLE 1

A monomer mixture comprising 80 parts of styrene and 20 parts of n-butyl acrylate containing, dissolved therein, 0.1 parts of 2,2-bis(4,4-di-t-butylperoxycyclohexyl)propane ("Parkadox 12", manufactured by Kayaku Nuley Co.) as the polymerization initiator was added to a mixture comprising 300 parts of water and 0.2 parts of partially saponified Poval (Gosenol GH-20, manufactured by Nihon Gosei Kagaku Kogyo Co.). After elevating the temperature up to 95° C. under stirring, polymerization was carried out for 4 hours. The degree of polymerization was about 34%. Then, 3.5 parts of benzoyl peroxide (hereinafter referred to as BPO) was added to the polymer dispersion and heated at 95° C. for 3 hours to complete the polymerization. The polymerizing degree was 99.9%.

The resultant polymer dispersion was cooled to room temperature, sufficiently washed, dewatered and dried to obtain a resin (R1). The resin (R1) had a Ts of 134° C. and Tg of 63.5° C. The resin exhibited two peaks as a result of molecular weight distribution analysis by GPC, the weight average molecular weight for the respective peaks being 475,000 and 19,900, the ratio in the content of the high molecular weight polymer to the low molecular weight polymer being 35/65.

Then, 94 parts of the resin (R1), 5 parts of carbon black (#40, manufactured by Mitsubishi Kasei Co.), and one part of a charge controller (Bontron S-34, manufactured by Orient Kagaku Kogyo Co.) were kneaded at 150° C. for about 5 min by using a twin-screw extruder, cooled and then finely pulverized by using a jet mill, to collect particles of 5-15 μm size as the toner.

The fixing property and the offset resistance of the toner were evaluated by using a fixing tester manufactured by modifying the fixing station of a copying machine, at a processing rate of 130 mm/sec and under a pressure of 40 kg. The results obtained are shown in Table 1.

EXAMPLE 2

Resin (R2) was prepared using the same procedure as in Example 1, except that the amount of BPO added was changed to 5 parts and the toner performance was evaluated. The results obtained are shown in Table 1.

EXAMPLE 3

Resin (R3) was prepared using the same procedure as in Example 1, except that the amount of Parcadox 12 added was changed to 0.2 parts and the toner performance was evaluated. The results obtained are shown in Table 1.

EXAMPLE 4

Resin (R4) was prepared using the same procedure as in Example 1, except that the polymerization time for obtaining the high molecular weight polymer in the first step was changed from 4 hours to 6 hours and the toner performance was evaluated. The results obtained are shown in Table 1.

COMPARATIVE EXAMPLE 1

Resin (R5) was prepared using the same procedure as in Example 1, except that BPO is used instead of Parkadox 12 and the polymerization temperature in the first step was changed from 95° C. to 70° C., and the toner performance was evaluated. The results obtained are shown in Table 1.

COMPARATIVE EXAMPLE 2

Resin (R6) was prepared using the same procedure as in Example 1, except that 0.2 parts of BPO were used instead of 0.1 parts of Parkadox 12 and the polymerization temperature in the first step was changed from 95° C. to 80° C., and the toner performance was evaluated. The results obtained are shown in Table 1.

COMPARATIVE EXAMPLE 3

Resin (R7) was prepared using the same procedure as in Comparative Example 1, except that the polymerization temperature in the first step was changed from 70° C. to 80° C. and the polymerization time was changed from 4 hours to 7 hours, and the toner performance was evaluated. The results obtained are shown in Table 1.

COMPARATIVE EXAMPLE 4

A nitrogen gas was blown into a mixture containing 80 parts of styrene, 20 parts of n-butyl acrylate, 200 parts of water, 0.5 parts of sodium alkyl diphenyl ether sulfonate as an emulsifier (Perex SS-H, manufactured by Kao Co.) and 0.3 parts of potassium persulfate under stirring the mixture and nitrogen substitution was conducted sufficiently. Then, the temperature was elevated to 70° C. under nitrogen atmosphere and emulsion polymerization was carried out for 5 hours. Thereafter, the resultant product was cooled to a room temperature to obtain a liquid emulsion (A). After adding a monomer mixture comprising 80 parts of styrene and 20 parts of n-butyl acrylate and containing, dissolved therein, 5 parts of BPO to 80 parts of the liquid emulsion (A), and further adding 300 parts of water and 0.7 parts of Gosenol GH-20 and mixing and stirring them, the mixture was heated to 85° C. After practicing suspension polymerization for about three hours, the resultant product was cooled to room temperature, sufficiently washed, dewatered and dried to obtain a resin (R8), and the toner performance was evaluated. The results obtained are shown in Table 1.

TABLE 1

| Polymerization condition in first step | Polymerization in second step |
| --- | --- |

TABLE 1-continued

|  | Initiator | | Polymerization | | Initiator | | | Resin Property | |
|---|---|---|---|---|---|---|---|---|---|
|  | Kind | Addition amount (part) | Time (hr) | Temperature (°C.) | Kind | Addition amount (part) | Resin No. | $T_3$ (°C.) | $T_4$ (°C.) |
| Example 1 | Parcadox 12 | 0.1 | 4 | 95 | BPO | 3.5 | R1 | 134 | 63.5 |
| Example 2 | " | " | " | " | " | 5 | R2 | 132 | 63 |
| Example 3 | " | 0.2 | 3 | " | " | 3.5 | R3 | 130 | 63 |
| Example 4 | " | 0.1 | 6 | " | " | " | R4 | 141 | 63 |
| Comparative Example 1 | BPO | " | 4 | 70 | " | " | R5 | 120 | 60 |
| Comparative Example 2 | " | 0.2 | " | 80 | " | " | R6 | 127 | 63 |
| Comparative Example 3 | " | 0.1 | 7 | " | " | " | R7 | 132 | 60 |
| *1 Comparative Example 4 | Potassium persulfate | 0.3 | 5 | 70 | " | " | R8 | 131 | 56 |

| | Resin Property | | | | | |
|---|---|---|---|---|---|---|
| | Weight average molecular weight of high molecular weight polymer | Weight average molecular weight of low molecular weight polymer | Contest of high molecular weight polymer | Non-offset fixing temperature (°C.) | Storability | Humidity proofness |
| Example 1 | 475,000 | 19,900 | 34.7 | higher than 180–240 | ⊙ | ○ |
| Example 2 | 458,000 | 13,200 | 33.0 | higher than 170–240 | ⊙ | ○ |
| Example 3 | 388,000 | 24,000 | 34.7 | higher than 170–230 | ⊙ | ○ |
| Example 4 | 732,800 | 20,300 | 54.0 | higher than 195–240 | ⊙ | ○ |
| Comparative Example 1 | 326,000 | 28,000 | 9.8 | 175~210 | ○ | ○ |
| Comparative Example 2 | 204,000 | 24,800 | 20.3 | 180~220 | ○ | ○ |
| Comparative Example 3 | 318,400 | 25,900 | 25.3 | 180~225 | ○ | ○ |
| *1 Comparative Example 4 | 1,012,700 | 18,500 | 18.5 | higher than 170–240 | X | X |

*1 first step polymerization: emulsion polymerization
second step polymerization: suspension polymerization

Having now described the present invention, it will be apparent to one of ordinary skill in the art that the above description may be modified in many ways while remaining within the spirit and scope of the present invention.

What is claimed as new and desired to be secured by Letters Patent of the United States is:

1. A resin for dry type toner, consisting essentially of a high molecular weight polymer having a weight average molecular weight of greater than about 350,000 and obtained from at least one monomer having a polymerizable vinyl group using a compound having at least three t-butyl peroxy groups per molecule as initiator, and a low molecular weight polymer prepared in the presence of said high molecular weight polymer, and having a softening temperature (Ts) of about 110° C. to 170° C. and a glass transition point (Tg) of about 40° C. to 63.5° C.

2. The resin for dry type toner as claimed in claim 1, wherein the resin is prepared through a two-step suspension polymerization, first a high and then a low molecular weight polymer being prepared in said polymerization.

3. The resin for dry type toner as claimed in claim 1, wherein the softening temperature (Ts) is in the range of 130° C. to 141° C.

4. The resin for dry type toner as claimed in claim 1, wherein the glass transition point (Tg) is in the range of 63° C. to 63.5° C.

5. The resin for dry type toner as claimed in claim 1, wherein said high molecular weight polymer has a weight average molecular weight in the range of about 388,000 to about 732,800.

6. The resin for dry type toner as claimed in claim 1, wherein said low molecular weight polymer has a weight average molecular weight in the range of about 13,200 to about 24,000.

* * * * *